(12) United States Patent
Polk

(10) Patent No.: US 8,987,349 B2
(45) Date of Patent: Mar. 24, 2015

(54) AQUEOUS DISPERSIONS OF POLYMER-ENCLOSED PARTICLES, RELATED COATING COMPOSITIONS AND COATED SUBSTRATES

(75) Inventor: W. David Polk, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 488 days.

(21) Appl. No.: 12/606,652

(22) Filed: Oct. 27, 2009

(65) Prior Publication Data

US 2010/0048814 A1 Feb. 25, 2010

Related U.S. Application Data

(63) Continuation of application No. 12/357,670, filed on Jan. 22, 2009, now abandoned, and a continuation-in-part of application No. 11/440,619, filed on May 25, 2006, now Pat. No. 7,910,634, and a continuation-in-part of application No. 11/337,062, filed on Jan. 20, 2006, now Pat. No. 7,605,194, and a continuation-in-part of application No. 10/876,031, filed on Jun. 24, 2004, now abandoned, and a continuation-in-part of application No. 10/809,764, filed on Mar. 25, 2004, now abandoned, and a continuation-in-part of application No. 10/809,595, filed on Mar. 25, 2004, now Pat. No. 7,666,338, and a continuation-in-part of application No. 10/809,639, filed on Mar. 25, 2004, now abandoned.

(51) Int. Cl.
| | |
|---|---|
| *C08K 9/00* | (2006.01) |
| *C08K 9/02* | (2006.01) |
| *C08K 9/10* | (2006.01) |
| *C08G 18/08* | (2006.01) |
| *C08G 18/12* | (2006.01) |
| *C08G 18/67* | (2006.01) |
| *C08G 18/75* | (2006.01) |
| *C09D 5/03* | (2006.01) |
| *C09D 7/12* | (2006.01) |
| *C09D 175/16* | (2006.01) |
| *B29C 47/00* | (2006.01) |
| *C08K 3/22* | (2006.01) |
| *C08K 5/00* | (2006.01) |
| *C08K 9/08* | (2006.01) |

(52) U.S. Cl.
CPC .............. *C08K 9/10* (2013.01); *C08G 18/0823* (2013.01); *C08G 18/12* (2013.01); *C08G 18/672* (2013.01); *C08G 18/758* (2013.01); *C09D 5/03* (2013.01); *C09D 7/1225* (2013.01); *C09D 175/16* (2013.01); *B29C 47/00* (2013.01); *B29C 47/0009* (2013.01); *C08G 2150/20* (2013.01); *C08K 3/22* (2013.01); *C08K 5/0041* (2013.01); *C08K 9/08* (2013.01)
USPC .......... 523/200; 523/160; 523/201; 523/202; 523/203; 524/555; 524/556; 524/847; 524/850; 428/626

(58) Field of Classification Search
CPC ......... C08L 23/00; C08L 33/08; C08L 33/10; C08L 33/12; C08L 2201/54; C08L 2201/50; C08K 5/01
USPC .......... 524/555, 556, 850, 847; 523/160, 161, 523/200, 201, 202, 203; 428/626
See application file for complete search history.

(56) References Cited

U.S. PATENT DOCUMENTS

| | | |
|---|---|---|
| 3,389,061 A | 6/1968 | Bono |
| 4,007,154 A | 2/1977 | Schimmel et al. |
| 4,041,115 A | 8/1977 | Jenkins et al. |
| 4,042,478 A | 8/1977 | Hazan et al. |
| 4,057,607 A | 11/1977 | Soehngen et al. |
| 4,302,562 A | 11/1981 | Becher et al. |
| 4,336,355 A | 6/1982 | Wu |
| 4,421,660 A | 12/1983 | Solc nee Hajna |
| 4,499,143 A | 2/1985 | Panush |
| 4,608,401 A | 8/1986 | Martin |
| 4,721,589 A | 1/1988 | Harris |
| 4,753,827 A | 6/1988 | Yoldas et al. |
| 4,754,012 A | 6/1988 | Yoldas et al. |
| 4,879,335 A | 11/1989 | Hirota et al. |
| 4,960,638 A | 10/1990 | Mukoyoshi et al. |
| 4,973,439 A | 11/1990 | Chang et al. |
| 5,035,745 A | 7/1991 | Lin et al. |
| 5,106,533 A | 4/1992 | Hendrickson et al. |
| 5,110,881 A | 5/1992 | McBain et al. |
| 5,169,582 A | 12/1992 | Illing |
| 5,190,586 A | 3/1993 | Mizuguchi et al. |
| 5,199,979 A | 4/1993 | Lin et al. |
| 5,201,948 A | 4/1993 | Fasano et al. |
| 5,308,648 A | 5/1994 | Prince et al. |
| 5,328,975 A | 7/1994 | Hanson et al. |
| 5,334,297 A | 8/1994 | Nakada et al. |
| 5,340,789 A | 8/1994 | Evans et al. |
| 5,348,998 A | 9/1994 | Ito et al. |
| 5,355,938 A | 10/1994 | Hosoya et al. |
| 5,382,431 A | 1/1995 | Pickart |
| 5,468,586 A | 11/1995 | Proper et al. |
| 5,480,633 A | 1/1996 | Simion et al. |
| 5,536,613 A | 7/1996 | Chang et al. |
| 5,538,548 A | 7/1996 | Yamazaki |
| 5,538,549 A | 7/1996 | Kato et al. |
| 5,605,720 A | 2/1997 | Allen et al. |

(Continued)

FOREIGN PATENT DOCUMENTS

| | | |
|---|---|---|
| CA | 2469335 A1 | 12/2003 |
| CN | 1303885 A | 7/2001 |

(Continued)

*Primary Examiner* — Hannah Pak
(74) *Attorney, Agent, or Firm* — William E. Kuss; Christine W. Trebilcock

(57) ABSTRACT

Disclosed are methods for making aqueous dispersions of polymer-enclosed particles, such as nanoparticles, polymerizable polymers useful in such a method, and cationic electrodepositable compositions comprising such aqueous dispersions.

34 Claims, No Drawings

(56) References Cited

U.S. PATENT DOCUMENTS

| | | | |
|---|---|---|---|
| 5,659,348 A | 8/1997 | Malhotra | |
| 5,716,435 A | 2/1998 | Aida et al. | |
| 5,747,015 A | 5/1998 | Oshika et al. | |
| 5,750,909 A | 5/1998 | Hawkins et al. | |
| 5,792,559 A | 8/1998 | Heithoff et al. | |
| 5,797,976 A | 8/1998 | Yamashita | |
| 5,800,923 A | 9/1998 | Amey et al. | |
| 5,814,673 A | 9/1998 | Khait | |
| 5,837,041 A | 11/1998 | Bean et al. | |
| 5,844,072 A | 12/1998 | Selsted et al. | |
| 5,853,809 A | 12/1998 | Campbell et al. | |
| 5,856,508 A | 1/1999 | Jaffe et al. | |
| 5,885,678 A | 3/1999 | Malhotra | |
| 5,902,711 A | 5/1999 | Smith et al. | |
| 5,919,530 A | 7/1999 | Hurley et al. | |
| 5,942,027 A | 8/1999 | Ikai et al. | |
| 5,944,994 A | 8/1999 | Asher et al. | |
| 5,990,202 A | 11/1999 | Nguyen et al. | |
| 5,990,219 A | 11/1999 | Sakai et al. | |
| 6,030,440 A | 2/2000 | Sekioka et al. | |
| 6,031,024 A | 2/2000 | Uraki et al. | |
| 6,099,627 A | 8/2000 | Saibara et al. | |
| 6,106,605 A | 8/2000 | Basil et al. | |
| 6,153,001 A | 11/2000 | Suzuki et al. | |
| 6,175,053 B1 | 1/2001 | Tsubouchi | |
| 6,180,685 B1 | 1/2001 | Khait | |
| 6,187,438 B1 | 2/2001 | Chopin et al. | |
| 6,267,810 B1 | 7/2001 | Pfaff et al. | |
| 6,296,860 B1 | 10/2001 | Hasegawa et al. | |
| 6,316,564 B1* | 11/2001 | Huybrechts et al. | 526/261 |
| 6,329,058 B1 | 12/2001 | Arney et al. | |
| 6,329,319 B1 | 12/2001 | Puglisi et al. | |
| 6,337,131 B1 | 1/2002 | Rupaner et al. | |
| 6,342,484 B1 | 1/2002 | Kulkarni et al. | |
| 6,355,189 B1 | 3/2002 | Basil et al. | |
| 6,365,648 B1 | 4/2002 | Couperus et al. | |
| 6,376,616 B1* | 4/2002 | December | 525/278 |
| 6,387,997 B1 | 5/2002 | Grolemund et al. | |
| 6,410,619 B2 | 6/2002 | Greene et al. | |
| 6,414,080 B1 | 7/2002 | Loeffler et al. | |
| 6,416,818 B1 | 7/2002 | Aikens et al. | |
| 6,417,249 B1 | 7/2002 | Nguyen et al. | |
| 6,428,797 B2 | 8/2002 | Fishman | |
| 6,474,972 B1 | 11/2002 | Endo et al. | |
| 6,479,003 B1 | 11/2002 | Furgiuele et al. | |
| 6,569,439 B1 | 5/2003 | Stier | |
| 6,572,690 B2 | 6/2003 | Rehman et al. | |
| 6,583,187 B1 | 6/2003 | Daly et al. | |
| 6,585,817 B2 | 7/2003 | Lee et al. | |
| 6,592,657 B2 | 7/2003 | Lee et al. | |
| 6,592,945 B2 | 7/2003 | Suzuki et al. | |
| 6,593,053 B1 | 7/2003 | Chang et al. | |
| 6,624,219 B1 | 9/2003 | Heger et al. | |
| 6,624,276 B2 | 9/2003 | Lamers et al. | |
| 6,635,693 B2 | 10/2003 | Wang et al. | |
| 6,666,983 B2 | 12/2003 | Marietti et al. | |
| 6,677,386 B1 | 1/2004 | Giezen et al. | |
| 6,726,900 B2 | 4/2004 | Scancarella et al. | |
| 6,800,127 B2 | 10/2004 | Babler | |
| 6,818,207 B1 | 11/2004 | Schoon et al. | |
| 6,841,591 B2 | 1/2005 | Vincent et al. | |
| 6,846,893 B1 | 1/2005 | Sherman et al. | |
| 6,852,153 B2 | 2/2005 | Uhlir-Tsang et al. | |
| 6,858,301 B2 | 2/2005 | Ganapathiappan | |
| 6,875,800 B2 | 4/2005 | Vanier et al. | |
| 6,894,086 B2 | 5/2005 | Munro et al. | |
| 6,900,176 B2 | 5/2005 | Dyker et al. | |
| 6,933,348 B2 | 8/2005 | Koike et al. | |
| 6,939,536 B2 | 9/2005 | Chen et al. | |
| 7,605,194 B2* | 10/2009 | Ferencz et al. | 523/205 |
| 2002/0061407 A1 | 5/2002 | Colton et al. | |
| 2002/0077385 A1 | 6/2002 | Miyabayashi | |
| 2002/0086168 A1 | 7/2002 | Sadvary et al. | |
| 2002/0127376 A1* | 9/2002 | Hutter et al. | 428/195 |
| 2002/0149002 A1 | 10/2002 | Womelsdorf et al. | |
| 2002/0193514 A1 | 12/2002 | Wang et al. | |
| 2003/0125416 A1 | 7/2003 | Munro et al. | |
| 2003/0125417 A1 | 7/2003 | Vanier et al. | |
| 2003/0177943 A1 | 9/2003 | Auweter et al. | |
| 2003/0220446 A1 | 11/2003 | Faler et al. | |
| 2004/0047887 A1 | 3/2004 | Kanemaru et al. | |
| 2004/0156994 A1 | 8/2004 | Wiese et al. | |
| 2004/0260013 A1 | 12/2004 | Richards | |
| 2005/0142094 A1 | 6/2005 | Kumar | |
| 2005/0159523 A1 | 7/2005 | Bremser et al. | |
| 2005/0182169 A1 | 8/2005 | Stubbe et al. | |
| 2005/0255060 A1 | 11/2005 | Oblong et al. | |
| 2005/0287348 A1 | 12/2005 | Faler et al. | |
| 2006/0002875 A1 | 1/2006 | Winkler et al. | |
| 2006/0008596 A1 | 1/2006 | Pokorny et al. | |
| 2006/0014099 A1 | 1/2006 | Faler et al. | |
| 2006/0042949 A1 | 3/2006 | McCollum et al. | |
| 2006/0191442 A1 | 8/2006 | He et al. | |
| 2006/0246305 A1 | 11/2006 | Cheng et al. | |
| 2006/0247373 A1 | 11/2006 | Goyal et al. | |
| 2006/0249389 A1 | 11/2006 | Fenn et al. | |
| 2006/0251896 A1* | 11/2006 | Ferencz et al. | 428/407 |
| 2006/0252881 A1 | 11/2006 | DeSaw et al. | |
| 2006/0259389 A1* | 11/2006 | Richter | 705/35 |
| 2006/0262881 A1* | 11/2006 | Cern | 375/300 |
| 2007/0015873 A1* | 1/2007 | Fenn | 525/191 |
| 2007/0166534 A1 | 7/2007 | Entenmann et al. | |
| 2010/0184911 A1* | 7/2010 | Polk | 524/556 |
| 2010/0294667 A1* | 11/2010 | Polk | 205/50 |

FOREIGN PATENT DOCUMENTS

| | | | |
|---|---|---|---|
| CN | 1337550 A | 2/2002 | |
| DE | 10311849 A1 | 9/2004 | |
| DE | 102006051893 A1 | 5/2008 | |
| EP | 0596835 A1 | 5/1994 | |
| EP | 0773268 A2 | 5/1997 | |
| EP | 1006161 A1 | 6/2000 | |
| EP | 1041124 A1 | 10/2000 | |
| EP | 1125760 A1 | 8/2001 | |
| EP | 1132448 A2 | 9/2001 | |
| EP | 1201684 A2 | 5/2002 | |
| EP | 1228850 A1 | 8/2002 | |
| EP | 1240993 A1 | 9/2002 | |
| EP | 1245589 A1 | 10/2002 | |
| EP | 1253174 A1 | 10/2002 | |
| EP | 1422072 A1 | 5/2004 | |
| EP | 1426422 A1 | 6/2004 | |
| EP | 1469049 A1 | 10/2004 | |
| EP | 1371694 A2 | 12/2006 | |
| FR | 2879476 A1 | 6/2006 | |
| GB | 2166651 A | 5/1986 | |
| JP | 60258270 A | 12/1985 | |
| JP | 2175769 A | 7/1990 | |
| JP | 3234705 A | 10/1991 | |
| JP | 7268039 A | 10/1995 | |
| JP | 2000351916 A | 12/2000 | |
| JP | 200162391 A | 3/2001 | |
| JP | 2002516388 A | 6/2002 | |
| JP | 2003261790 A | 9/2003 | |
| JP | 200410734 A | 1/2004 | |
| WO | 9531507 A1 | 11/1995 | |
| WO | 9817726 A1 | 4/1998 | |
| WO | 9963006 A2 | 12/1999 | |
| WO | 0020520 A1 | 4/2000 | |
| WO | 0063305 A1 | 10/2000 | |
| WO | 0069916 A1 | 11/2000 | |
| WO | 0210292 A1 | 2/2002 | |
| WO | 0214391 A2 | 2/2002 | |
| WO | 0222749 A1 | 3/2002 | |
| WO | 0224757 A2 | 3/2002 | |
| WO | 0226894 A1 | 4/2002 | |
| WO | 02054136 A2 | 7/2002 | |
| WO | 02062881 A2 | 8/2002 | |
| WO | 02102904 A2 | 12/2002 | |
| WO | 03087236 A1 | 10/2003 | |
| WO | 03095532 A1 | 11/2003 | |
| WO | 03095571 A1 | 11/2003 | |
| WO | 04000916 A2 | 12/2003 | |

(56) References Cited

FOREIGN PATENT DOCUMENTS

| WO | 2004081222 | A2 | 9/2004 |
|---|---|---|---|
| WO | 2004087415 | A2 | 10/2004 |
| WO | 2004098793 | A2 | 11/2004 |
| WO | 2005056696 | A2 | 6/2005 |
| WO | 2005105901 | A1 | 11/2005 |
| WO | 2006077256 | A1 | 7/2006 |
| WO | 2006105600 | A1 | 10/2006 |
| WO | 2007024461 | A2 | 3/2007 |
| WO | 2007024462 | A2 | 3/2007 |

* cited by examiner

US 8,987,349 B2

AQUEOUS DISPERSIONS OF POLYMER-ENCLOSED PARTICLES, RELATED COATING COMPOSITIONS AND COATED SUBSTRATES

CROSS-REFERENCE TO RELATED APPLICATION

This patent application is a continuation of U.S. patent application Ser. No. 12/357,670 filed Jan. 22, 2009, entitled: "AQUEOUS DISPERSIONS OF POLYMER-ENCLOSED PARTICLES, RELATED COATING COMPOSITIONS AND COATED SUBSTRATES" incorporated herein by reference. This patent application is also a continuation-in-part of U.S. patent application Ser. No. 11/440,619 filed May 25, 2006, entitled: "AQUEOUS DISPERSIONS OF POLYMER-ENCLOSED PARTICLES, RELATED COATING COMPOSITIONS AND COATED SUBSTRATES", which is a continuation-in-part of U.S. patent application Ser. No. 11/337,062, filed Jan. 20, 2006, which is entitled "Aqueous Dispersions of Polymer-Enclosed Particles, Related Coating Compositions and Coated Substrates", which is a continuation-in-part of: (i) U.S. patent application Ser. No. 10/876,031, which was filed on Jun. 24, 2004, and entitled, "Aqueous Dispersions of Microparticles Having a Nanoparticulate Phase and Coating Compositions Containing The Same"; (ii) U.S. patent application Ser. No. 10/809,764, which was filed on Mar. 25, 2004, and is entitled, "Process For Manufacturing Powder Coating Compositions Introducing Hard to Incorporate Additives and/or Providing Dynamic Color Control; (iii) U.S. patent application Ser. No. 10/809,595, which was filed on Mar. 25, 2004, and is entitled, "Focused Heat Extrusion Process For Manufacturing Powder Coating Compositions"; and (iv) U.S. patent application Ser. No. 10/809,639, which was filed on Mar. 25, 2004, and is entitled, "Apparatus For Manufacturing Thermosetting Powder Coating Compositions With Dynamic Control Including Low Pressure Injection Systems", each of which is being incorporated by reference herein.

FIELD OF THE INVENTION

The present invention relates to, among other things, methods for making aqueous dispersions of polymer-enclosed particles, such as nanoparticles, polymerizable polymers useful in such a method, and cationic electrodepositable compositions comprising such aqueous dispersions.

BACKGROUND INFORMATION

Coating compositions, such as cationic electrodepositable compositions, sometimes include colorant and/or filler particles to impart color and/or performance properties in the resulting coating. Pigment particles tend to have a strong affinity for each other and, unless separated, tend to clump together to form agglomerates. Therefore, these agglomerates are often dispersed in a resinous grind vehicle and, optionally, dispersants by milling or grinding using high shear techniques to break up the agglomerates. If nano-sized pigment particles are desired, further milling is often required to obtain the desired particle size.

Pigments and fillers usually consist of solid crystalline particles ranging in diameter from about 0.02 to 2 microns (i.e., 20 to 2000 nanometers). Agglomeration is a serious problem for nano-sized particle pigments and filler materials (such as carbon black) in particular because these nanoparticles have a relatively large surface area. Thus, acceptable dispersion of such nanoparticles often requires an inordinate amount of resinous grind vehicle and/or dispersant to effect de-agglomeration and to prevent subsequent re-agglomeration of the nanoparticles.

The presence of such high levels of resinous grind vehicles and dispersants, however, in the final coating composition can be detrimental to the resultant coating. For example, high levels of dispersants have been known to contribute to water sensitivity of the resultant coating. Also, some resinous grind vehicles, for example, acrylic grind vehicles, can negatively impact coating performance properties such as chip resistance and flexibility.

Electrodepositable coating compositions are often used to provide coatings for protection of metal substrates, such as those used in the automobile industry. Electrodeposition processes often provide higher paint utilization, outstanding corrosion protection, low environmental contamination, and/or a highly automated process relative to non-electrophoretic coating methods.

In the electrodeposition process, an article having an electroconductive substrate, such as an automobile body or body part, is immersed into a bath of a coating composition of an aqueous emulsion of film forming polymer, the electroconductive substrate serving as a charge electrode in an electrical circuit comprising the electrode and an oppositely charged counter-electrode. An electrical current is passed between the article and a counter-electrode in electrical contact with the aqueous emulsion, until a coating having the desired thickness is deposited on the article. In a cathodic electrocoating process, the article to be coated is the cathode and the counter-electrode is the anode.

It would also be desirable to provide an aqueous dispersion of resin-enclosed particles, wherein re-agglomeration of the particles is minimized, and which is suitable for use in preparing cationic electrodepositable coating compositions that exhibit the advantages of electrodepositable coating compositions. It would also be desirable to provide such cationic electrodepositable coating compositions that are capable of producing color-imparting non-hiding coating layers.

SUMMARY OF THE INVENTION

In certain respects, the present invention is directed to methods for making an aqueous dispersion of polymer-enclosed particles. The methods comprise (1) providing a mixture, in an aqueous medium, of (a) particles, (b) a polymerizable ethylenically unsaturated monomer, and (c) a water-dispersible polymerizable dispersant comprising a cationic acrylic polymer comprising pendant and/or terminal ethylenic unsaturation, and (2) polymerizing the ethylenically unsaturated monomer and polymerizable dispersant to form an aqueous dispersion of polymer-enclosed particles comprising a cationic acrylic polymer.

In other respects, the present invention is directed to methods for making an aqueous dispersion of polymer-enclosed nanoparticles. The methods comprise (1) providing a mixture, in an aqueous medium, of (a) particles having an average particle size greater than 300 nanometers, (b) a polymerizable ethylenically unsaturated monomer, and (c) a water-dispersible polymerizable dispersant comprising a cationic acrylic polymer comprising pendant and/or terminal ethylenic unsaturation, (2) subjecting the mixture to conditions whereby (a) the particles are formed into nanoparticles having an average particle size less than 300 nanometers, and (b) at least a portion of the ethylenically unsaturated monomer and polymerizable dispersant are polymerized during the formation of the nanoparticles to form an aqueous dispersion of polymer-enclosed nanoparticles comprising a cationic acrylic polymer.

In still other respects, the present invention is directed to a curable, electrodepositable coating composition comprising a resinous phase dispersed in an aqueous medium, wherein the resinous phase comprises: (a) a curing agent comprising reactive groups reactive with active-hydrogen groups, and (b) polymer-enclosed particles comprising a cationic polymer comprising the reaction product of (i) a polymerizable ethylenically unsaturated monomer, and (ii) a water-dispersible polymerizable dispersant comprising a cationic acrylic polymer comprising pendant and/or terminal ethylenic unsaturation.

In yet other respects, the present invention is directed to methods for depositing a color-imparting non-hiding coating layer on a substrate. Such methods comprise electrodepositing on at least a portion of the substrate an electrodepositable coating composition of the present invention.

The present invention is also directed to reflective surface at least partially coated with such coating layers.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to methods for making an aqueous dispersion of polymer-enclosed particles. As used herein, the term "dispersion" refers to a two-phase system in which one phase includes finely divided particles distributed throughout a second phase, which is a continuous phase. The dispersions of the present invention often are oil-in-water emulsions, wherein an aqueous medium provides the continuous phase of the dispersion in which the polymer-enclosed particles are suspended as the organic phase.

As used herein, the term "aqueous", "aqueous phase", "aqueous medium," and the like, refers to a medium that either consists exclusively of water or comprises predominantly water in combination with another material, such as, for example, an inert organic solvent. In certain embodiments, the amount of organic solvent present in the aqueous dispersions of the present invention is less than 20 weight percent, such as less than 10 weight percent, or, in some cases, less than 5 weight percent, or, in yet other cases, less than 2 weight percent, with the weight percents being based on the total weight of the dispersion. Non-limiting examples of suitable organic solvents are propylene glycol monobutyl ether, ethylene glycol monohexyl ether, ethylene glycol monobutyl ether, n-butanol, benzyl alcohol, and mineral spirits.

As used herein, the term "polymer-enclosed particles" refers to particles that are at least partially enclosed by, i.e., confined within, a polymer to an extent sufficient to physically separate particles from each other within the aqueous dispersion, thereby preventing significant agglomeration of the particles. It will be appreciated, of course, that the dispersions of the present invention may also include particles that are not polymer-enclosed particles.

In certain embodiments, the particles that are enclosed by a polymer in the aqueous dispersions of the present invention comprise nanoparticles. As used herein, the term "nanoparticles" refers to particles that have an average particle size of less than 1 micron. In certain embodiments, the nanoparticles used in the present invention have an average particles size of 300 nanometers or less, such as 200 nanometers or less, or, in some cases, 100 nanometers or less. Therefore, in certain embodiments, the aqueous dispersions of the present invention comprise nanoparticles that are polymer-enclosed and, therefore, are not significantly agglomerated.

For purposes of the present invention, average particle size can be measured according to known laser scattering techniques. For example, average particle size can be determined using a Horiba Model LA 900 laser diffraction particle size instrument, which uses a helium-neon laser with a wave length of 633 nm to measure the size of the particles and assumes the particle has a spherical shape, i.e., the "particle size" refers to the smallest sphere that will completely enclose the particle. Average particle size can also be determined by visually examining an electron micrograph of a transmission electron microscopy ("TEM") image of a representative sample of the particles, measuring the diameter of the particles in the image, and calculating the average primary particle size of the measured particles based on magnification of the TEM image. One of ordinary skill in the art will understand how to prepare such a TEM image and determine the primary particle size based on the magnification. The primary particle size of a particle refers to the smallest diameter sphere that will completely enclose the particle. As used herein, the term "primary particle size" refers to the size of an individual particle.

The shape (or morphology) of the particles can vary. For example, generally spherical morphologies (such as solid beads, microbeads, or hollow spheres), can be used, as well as particles that are cubic, platy, or acicular (elongated or fibrous). Additionally, the particles can have an internal structure that is hollow, porous or void free, or a combination of any of the foregoing, e.g., a hollow center with porous or solid walls. For more information on suitable particle characteristics see H. Katz et al. (Ed.), Handbook of Fillers and Plastics (1987) at pages 9-10.

Depending on the desired properties and characteristics of the resultant dispersion and/or coating compositions of the present invention (e.g., coating hardness, scratch resistance, stability, or color), mixtures of one or more particles having different average particle sizes can be employed.

The particles, such as nanoparticles, present in the aqueous dispersions of the present invention can be formed from polymeric and/or non-polymeric inorganic materials, polymeric and/or non-polymeric organic materials, composite materials, as well as mixtures of any of the foregoing. As used herein, "formed from" denotes open, e.g., "comprising," claim language. As such, it is intended that a composition or substance "formed from" a list of recited components be a composition comprising at least these recited components, and can further comprise other, non-recited components, during the composition's formation. Additionally, as used herein, the term "polymer" is meant to encompass oligomers, and includes without limitation both homopolymers and copolymers.

As used herein, the term "polymeric inorganic material" means a polymeric material having a backbone repeat unit based on an element or elements other than carbon. Moreover, as used herein, the term "polymeric organic materials" means synthetic polymeric materials, semi-synthetic polymeric materials and natural polymeric materials, all of which have a backbone repeat unit based on carbon.

The term "organic material," as used herein, means carbon containing compounds wherein the carbon is typically bonded to itself and to hydrogen, and often to other elements as well, and excludes binary compounds such as the carbon oxides, the carbides, carbon disulfide, etc.; such ternary compounds as the metallic cyanides, metallic carbonyls, phosgene, carbonyl sulfide, etc.; and carbon-containing ionic compounds such as metallic carbonates, for example calcium carbonate and sodium carbonate.

As used herein, the term "inorganic material" means any material that is not an organic material.

As used herein, the term "composite material" means a combination of two or more differing materials. The particles formed from composite materials generally have a hardness at their surface that is different from the hardness of the internal portions of the particle beneath its surface. More specifically, the surface of the particle can be modified in any manner well known in the art, including, but not limited to, chemically or physically changing its surface characteristics using techniques known in the art.

For example, a particle can be formed from a primary material that is coated, clad or encapsulated with one or more secondary materials to form a composite particle that has a softer surface. In certain embodiments, particles formed from composite materials can be formed from a primary material that is coated, clad or encapsulated with a different form of the primary material. For more information on particles useful in the present invention, see G. Wypych, Handbook of Fillers, 2nd Ed. (1999) at pages 15-202.

As aforementioned, the particles useful in the present invention can include any inorganic materials known in the art. Suitable particles can be formed from ceramic materials, metallic materials, and mixtures of any of the foregoing. Non-limiting examples of such ceramic materials can comprise metal oxides, mixed metal oxides, metal nitrides, metal carbides, metal sulfides, metal silicates, metal borides, metal carbonates, and mixtures of any of the foregoing. A specific, non-limiting example of a metal nitride is boron nitride; a specific, non-limiting example of a metal oxide is zinc oxide; non-limiting examples of suitable mixed metal oxides are aluminum silicates and magnesium silicates; non-limiting examples of suitable metal sulfides are molybdenum disulfide, tantalum disulfide, tungsten disulfide, and zinc sulfide; non-limiting examples of metal silicates are aluminum silicates and magnesium silicates, such as vermiculite.

In certain embodiments of the present invention, the particles comprise inorganic materials selected from aluminum, barium, bismuth, boron, cadmium, calcium, cerium, cobalt, copper, iron, lanthanum, magnesium, manganese, molybdenum, nitrogen, oxygen, phosphorus, selenium, silicon, silver, sulfur, tin, titanium, tungsten, vanadium, yttrium, zinc, and zirconium, including oxides thereof, nitrides thereof, phosphides thereof, phosphates thereof, selenides thereof, sulfides thereof, sulfates thereof, and mixtures thereof. Suitable non-limiting examples of the foregoing inorganic particles include alumina, silica, titania, ceria, zirconia, bismuth oxide, magnesium oxide, iron oxide, aluminum silicate, boron carbide, nitrogen doped titania, and cadmium selenide.

The particles can comprise, for example, a core of essentially a single inorganic oxide, such as silica in colloidal, fumed, or amorphous form, alumina or colloidal alumina, titanium dioxide, iron oxide, cesium oxide, yttrium oxide, colloidal yttria, zirconia, e.g., colloidal or amorphous zirconia, and mixtures of any of the foregoing; or an inorganic oxide of one type upon which is deposited an organic oxide of another type.

Non-polymeric, inorganic materials useful in forming the particles used in the present invention can comprise inorganic materials selected from graphite, metals, oxides, carbides, nitrides, borides, sulfides, silicates, carbonates, sulfates, and hydroxides. A non-limiting example of a useful inorganic oxide is zinc oxide. Non-limiting examples of suitable inorganic sulfides include molybdenum disulfide, tantalum disulfide, tungsten disulfide, and zinc sulfide. Non-limiting examples of useful inorganic silicates include aluminum silicates and magnesium silicates, such as vermiculite. Non-limiting examples of suitable metals include molybdenum, platinum, palladium, nickel, aluminum, copper, gold, iron, silver, alloys, and mixtures of any of the foregoing.

In certain embodiments, the particles can be selected from fumed silica, amorphous silica, colloidal silica, alumina, colloidal alumina, titanium dioxide, iron oxide, cesium oxide, yttrium oxide, colloidal yttria, zirconia, colloidal zirconia, and mixtures of any of the foregoing. In certain embodiments, the particles comprise colloidal silica. As disclosed above, these materials can be surface treated or untreated. Other useful particles include surface-modified silicas, such as are described in U.S. Pat. No. 5,853,809 at column 6, line 51 to column 8, line 43, incorporated herein by reference.

As another alternative, a particle can be formed from a primary material that is coated, clad or encapsulated with one or more secondary materials to form a composite material that has a harder surface. Alternatively, a particle can be formed from a primary material that is coated, clad or encapsulated with a differing form of the primary material to form a composite material that has a harder surface.

In one example, and without limiting the present invention, an inorganic particle formed from an inorganic material, such as silicon carbide or aluminum nitride, can be provided with a silica, carbonate or nanoclay coating to form a useful composite particle. In another non-limiting example, a silane coupling agent with alkyl side chains can interact with the surface of an inorganic particle formed from an inorganic oxide to provide a useful composite particle having a "softer" surface. Other examples include cladding, encapsulating or coating particles formed from non-polymeric or polymeric materials with differing non-polymeric or polymeric materials. A specific non-limiting example of such composite particles is DUALITE™, which is a synthetic polymeric particle coated with calcium carbonate that is commercially available from Pierce and Stevens Corporation of Buffalo, N.Y.

In certain embodiments, the particles used in the present invention have a lamellar structure. Particles having a lamellar structure are composed of sheets or plates of atoms in hexagonal array, with strong bonding within the sheet and weak van der Waals bonding between sheets, providing low shear strength between sheets. A non-limiting example of a lamellar structure is a hexagonal crystal structure. Inorganic solid particles having a lamellar fullerene (i.e., buckyball) structure are also useful in the present invention.

Non-limiting examples of suitable materials having a lamellar structure include boron nitride, graphite, metal dichalcogenides, mica, talc, gypsum, kaolinite, calcite, cadmium iodide, silver sulfide and mixtures thereof. Suitable metal dichalcogenides include molybdenum disulfide, molybdenum diselenide, tantalum disulfide, tantalum diselenide, tungsten disulfide, tungsten diselenide and mixtures thereof.

The particles can be formed from non-polymeric, organic materials. Non-limiting examples of non-polymeric, organic materials useful in the present invention include, but are not limited to, stearates (such as zinc stearate and aluminum stearate), diamond, carbon black and stearamide.

The particles used in the present invention can be formed from inorganic polymeric materials. Non-limiting examples of useful inorganic polymeric materials include polyphosphazenes, polysilanes, polysiloxanes, polygermanes, polymeric sulfur, polymeric selenium, silicones and mixtures of any of the foregoing. A specific, non-limiting example of a particle formed from an inorganic polymeric material suitable for use in the present invention is Tospearl, which is a particle formed from cross-linked siloxanes and is commercially available from Toshiba Silicones Company, Ltd. of Japan.

The particles can be formed from synthetic, organic polymeric materials. Non-limiting examples of suitable organic polymeric materials include, but are not limited to, thermoset materials and thermoplastic materials. Non-limiting examples of suitable thermoplastic materials include thermoplastic polyesters, such as polyethylene terephthalate, polybutylene terephthalate and polyethylene naphthalate, polycarbonates, polyolefins, such as polyethylene, polypropylene and polyisobutene, acrylic polymers, such as copolymers of styrene and an acrylic acid monomer and polymers containing methacrylate, polyamides, thermoplastic polyurethanes, vinyl polymers, and mixtures of any of the foregoing.

Non-limiting examples of suitable thermoset materials include thermoset polyesters, vinyl esters, epoxy materials, phenolics, aminoplasts, thermoset polyurethanes and mixtures of any of the foregoing. A specific, non-limiting example of a synthetic polymeric particle formed from an epoxy material is an epoxy microgel particle.

The particles can also be hollow particles formed from materials selected from polymeric and non-polymeric inorganic materials, polymeric and non-polymeric organic materials, composite materials and mixtures of any of the foregoing. Non-limiting examples of suitable materials from which the hollow particles can be formed are described above.

In certain embodiments, the particles used in the present invention comprise an organic pigment, for example, azo compounds (monoazo, di-azo, β-Naphthol, Naphthol AS salt type azo pigment lakes, benzimidazolone, di-azo condensation, isoindolinone, isoindoline), and polycyclic (phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone) pigments, and mixtures of any of the foregoing. In certain embodiments, the organic material is selected from perylenes, quinacridones, phthalocyanines, isoindolines, dioxazines (that is, triphenedioxazines), 1,4-diketopyrrolopyrroles, anthrapyrimidines, anthanthrones, flavanthrones, indanthrones, perinones, pyranthrones, thioindigos, 4,4'-diamino-1,1'-dianthraquinonyl, as well as substituted derivatives thereof, and mixtures thereof.

Perylene pigments used in the practice of the present invention may be unsubstituted or substituted. Substituted perylenes may be substituted at imide nitrogen atoms for example, and substituents may include an alkyl group of 1 to 10 carbon atoms, an alkoxy group of 1 to 10 carbon atoms and a halogen (such as chlorine) or combinations thereof. Substituted perylenes may contain more than one of any one substituent. The diimides and dianhydrides of perylene-3,4,9,10-tetracarboxylic acid are preferred. Crude perylenes can be prepared by methods known in the art.

Phthalocyanine pigments, especially metal phthalocyanines may be used. Although copper phthalocyanines are more readily available, other metal-containing phthalocyanine pigments, such as those based on zinc, cobalt, iron, nickel, and other such metals, may also be used. Metal-free phthalocyanines are also suitable. Phthalocyanine pigments may be unsubstituted or partially substituted, for example, with one or more alkyl (having 1 to 10 carbon atoms), alkoxy (having 1 to 10 carbon atoms), halogens such as chlorine, or other substituents typical of phthalocyanine pigments. Phthalocyanines may be prepared by any of several methods known in the art. They are typically prepared by a reaction of phthalic anhydride, phthalonitrile, or derivatives thereof, with a metal donor, a nitrogen donor (such as urea or the phthalonitrile itself), and an optional catalyst, preferably in an organic solvent.

Quinacridone pigments, as used herein, include unsubstituted or substituted quinacridones (for example, with one or more alkyl, alkoxy, halogens such as chlorine, or other substituents typical of quinacridone pigments), and are suitable for the practice of the present invention. The quinacridone pigments may be prepared by any of several methods known in the art but are preferably prepared by thermally ring-closing various 2,5-dianilinoterephthalic acid precursors in the presence of polyphosphoric acid.

Isoindoline pigments, which can optionally be substituted symmetrically or unsymmetrically, are also suitable for the practice of the present invention can be prepared by methods known in the art. A suitable isoindoline pigment, Pigment Yellow 139, is a symmetrical adduct of iminoisoindoline and barbituric acid precursors. Dioxazine pigments (that is, triphenedioxazines) are also suitable organic pigments and can be prepared by methods known in the art.

Mixtures of any of the previously described inorganic particles and/or organic particles can also be used.

The particles useful in the aqueous dispersions of the present invention can comprise color-imparting particles. By the term "color-imparting particles" is meant a particle that significantly absorbs some wavelengths of visible light, that is, wavelengths ranging from 400 to 700 nm, more than it absorbs other wavelengths in the visible region.

If desired, the particles described above can be formed into nanoparticles. In certain embodiments, the nanoparticles are formed in situ during formation of the aqueous dispersion of polymer-enclosed particles, as described in more detail below. In other embodiments, however, the nanoparticles are formed prior to their incorporation into the aqueous dispersion. In these embodiments, the nanoparticles can be formed by any of a number of various methods known in the art. For example, the nanoparticles can be prepared by pulverizing and classifying the dry particulate material. For example, bulk pigments such as any of the inorganic or organic pigments discussed above, can be milled with milling media having a particle size of less than 0.5 millimeters (mm), or less than 0.3 mm, or less than 0.1 mm. The pigment particles typically are milled to nanoparticle sizes in a high energy mill in one or more solvents (either water, organic solvent, or a mixture of the two), optionally in the presence of a polymeric grind vehicle. If necessary, a dispersant can be included, for example, (if in organic solvent) SOLSPERSE® 32000 or 32500 available from Lubrizol Corporation, or (if in water) SOLSPERSE® 27000, also available from Lubrizol Corporation. Other suitable methods for producing the nanoparticles include crystallization, precipitation, gas phase condensation, and chemical attrition (i.e., partial dissolution).

As indicated, in certain embodiments, the aqueous dispersions of the present invention comprise polymer-enclosed particles comprising a cationic polymer. As used herein, the term "cationic polymer" refers to a polymer that comprises cationic functional groups that impart a positive charge, such as, for example, sulfonium salt groups and amino groups. Amino groups can be introduced into the polymer by any of a variety of techniques, such as, for example, the use of an amino group containing monomer to form the polymer or by first forming an epoxide functional polymer and then reacting the epoxide functional polymer with a compound comprising a primary or secondary amine group. Sulfonium salt groups can also be introduced by a variety of techniques, such as, for example, the reaction of an epoxy group with a sulfide in the presence of an acid.

In certain embodiments of the present invention, the cationic polymer comprises the reaction product of (i) a cationic acrylic polymer comprising pendant and/or terminal ethylenic unsaturation and (ii) a polymerizable ethylenically unsaturated monomer. As used herein, the term "cationic acrylic polymer" refers to a cationic polymer prepared from polymerizable ethylenically unsaturated monomers by, for example, traditional free radical solution polymerization techniques that are well-known to those skilled in the art, optionally in the presence of suitable catalysts such as organic peroxides or azo compounds, for example, benzoyl peroxide or N,N-azobis(isobutyronitrile). As indicated, such polymerizations often are carried out in an organic solution in which the monomers are soluble by techniques conventional in the art.

As used herein, the phrase "pendant and/or terminal ethylenic unsaturation" means that at least some of the pendant and/or terminal ends of the cationic acrylic polymer contain a functional group containing ethylenic unsaturation. Such cationic acrylic polymers may also include, but need not necessarily include, internal ethylenic unsaturation.

In certain embodiments, the cationic acrylic polymer comprising pendant and/or terminal ethylenic unsaturation further comprises active hydrogen groups. As used herein, the term "active hydrogen" refers to functional groups that are reactive with isocyanates as determined by the Zerewitnoff test as described in the JOURNAL OF THE AMERICAN CHEMICAL SOCIETY, Vol. 49, page 3181 (1927).

The active hydrogen containing cationic acrylic polymers comprising pendant and/or terminal ethylenic unsaturation that are employed in certain embodiments of the present invention may be prepared by a variety of techniques, such as, for example, a process comprising: (a) preparing an acrylic polymer comprising active hydrogen groups and epoxide groups; (b) reacting a portion of the active hydrogen groups on the acrylic polymer with an ethylenically unsaturated isocyanate; and (c) reacting at least a portion of the epoxide groups with a compound comprising a primary or secondary amine. As a result, in certain embodiments, the active hydrogen containing acrylic polymers comprising pendant and/or terminal ethylenically unsaturation that are employed in certain embodiments of the present invention comprise the reaction product of: (a) a acrylic polymer comprising active hydrogen groups and epoxy groups; (b) an ethylenically unsaturated isocyanate; and (c) a primary or secondary amine.

Acrylic polymers comprising active hydrogen groups and epoxide groups can be prepared by reacting active hydrogen containing ethylenically unsaturated compounds, such as (meth)acrylates, allyl carbamates, and allyl carbonates, with epoxide group containing ethylenically unsaturated compounds, such as (meth)acrylates, allyl carbamates, and allyl carbonates, optionally in the presence of ethylenically unsaturated compounds, such as (meth)acrylates allyl carbamates, and allyl carbonates, that do not include active hydrogen groups and epoxide groups. The (meth)acrylate functional groups may be represented by the formula, $CH_2=C(R_1)—C(O)O—$, wherein $R_1$ is hydrogen or methyl. The allyl carbamates and carbonates may be represented by the formulae, $CH_2=CH—CH_2—NH—C(O)O—$, and $CH_2=CH—CH_2—O—(O)O—$, respectively. As used herein, "(meth)acrylate" is meant to include both acrylates and methacrylates.

Active hydrogen containing ethylenically unsaturated compounds suitable for use in preparing the foregoing cationic acrylic polymers include, for example, hydroxyl functional monomers, such as hydroxyalkyl(meth)acrylates having from 1 to 18 carbon atoms in the alkyl radical, the alkyl radical being substituted or unsubstituted. Specific non-limiting examples of such materials include 2-hydroxyethyl (meth)acrylate, 2-hydroxypropyl(meth)acrylate, 2-hydroxybutyl(meth)acrylate, hexane-1,6-diol mono(meth)acrylate, 4-hydroxybutyl(meth)acrylate, as well as mixtures thereof.

Epoxide group containing ethylenically unsaturated compounds suitable for use in preparing the foregoing cationic acrylic polymers include, for example, glycidyl(meth)acrylate, 3,4-epoxycyclohexylmethyl(meth)acrylate, 2-(3,4-epoxycyclohexyl)ethyl(meth)acrylate, and allyl glycidyl ether, as well as mixtures thereof.

Non-limiting examples of other ethylenically unsaturated compounds suitable for use in preparing the foregoing acrylic polymers include vinyl monomers, such as alkyl esters of acrylic and methacrylic acids, for example, ethyl(meth)acrylate, methyl(meth)acrylate, butyl(meth)acrylate, 2-ethylhexyl(meth)acrylate, isobornyl(meth)acrylate and lauryl (meth)acrylate; vinyl aromatics such as styrene and vinyl toluene; acrylamides such as N-butoxymethyl acrylamide; acrylonitriles; dialkyl esters of maleic and fumaric acids; vinyl and vinylidene halides; vinyl acetate; vinyl ethers; allyl ethers; allyl alcohols; derivatives thereof and mixtures thereof.

In certain embodiments of the present invention, the acrylic polymer comprising active hydrogen groups and epoxide groups is the reaction product of reactants comprising: (a) 1 to 25 percent by weight, such as 5 to 20 percent by weight, based on the total weight of the reactants, of active hydrogen containing ethylenically unsaturated compounds; (b) 1 to 25 percent by weight, such as 5 to 20 percent by weight, based on the total weight of the reactants, of epoxide group containing ethylenically unsaturated compounds; and (c) 50 to 98 percent by weight, such as 60 to 90 percent by weight, based on the total weight of the reactants, of ethylenically unsaturated compounds that do not include active hydrogen groups and epoxide groups.

As previously indicated, in certain embodiments, the active hydrogen containing cationic acrylic polymers comprising pendant and/or terminal ethylenic unsaturation that are employed in certain embodiments of the present invention are prepared by reacting a portion of the active hydrogen groups on the previously described acrylic polymer comprising active hydrogen groups and epoxide groups with an ethylenically unsaturated isocyanate. As used herein, the term "ethylenically unsaturated isocyanate" refers to a compound that includes ethylenic unsaturation and at least one isocyanate, —NCO, group.

Ethylenically unsaturated isocyanates suitable for use in the present invention include, for example, compounds that are the reaction product of a hydroxyl-functional ethylenically unsaturated compound, such as any of the hydroxyl functional monomers described earlier, and a polyisocyanate. The polyisocyanate that is reacted with the hydroxy functional monomer can be any organic polyisocyanate, such as any aromatic, aliphatic, cycloaliphatic, or heterocyclic polyisocyanate that may be unsubstituted or substituted. Many such organic polyisocyanates are known, examples of which include: toluene-2,4-diisocyanate, toluene-2,6-diisocyanate, and mixtures thereof; diphenylmethane-4,4[prime]-diisocyanate, diphenylmethane-2,4[prime]-diisocyanate and mixtures thereof; o-, m- and/or p-phenylene diisocyanate; biphenyl diisocyanate; 3,3[prime]-dimethyl-4,4[prime]-diphenylene diisocyanate; propane-1,2-diisocyanate and propane-1,3-diisocyanate; butane-1,4-diisocyanate; hexane-1,6-diisocyanate; 2,2,4-trimethylhexane-1,6-diisocyanate; lysine methyl ester diisocyanate; bis(isocyanatoethyl)fumarate; isophorone diisocyanate; ethylene diisocyanate; dodecane-1,12-diisocyanate; cyclobutane-1,3-diisocyanate; cyclohexane-1,2-diisocyanate, cyclohexane-1,3-diisocyanate, cyclohexane-1,4-diisocyanate and mixtures thereof; methylcyclohexyl diisocyanate; hexahydrotoluene-2,4-diisocyanate; hexahydrotoluene-2,6-diisocyanate and mixtures thereof; hexahydrophenylene-1,3-diisocyanate; hexahydrophenylene-1,4-diisocyanate and mixtures thereof; perhydrodiphenylmethane-2,4[prime]-diisocyanate, perhydrodiphenylmethane-4,4[prime]-diisocyanate and mixtures thereof; 4,4[prime]-methylene bis(isocyanato cyclohexane) available from Mobay Chemical Company as Desmodur W; 3,3[prime]-dichloro-4,4[prime]-diisocyanatobiphenyl, tris (4-isocyanatophenyl)methane; 1,5-diisocyanatonaphthalene, hydrogenated toluene diisocyanate; 1-isocyanatomethyl-5-isocyanato-1,3,3-trimethylcyclohexane and 1,3,5-tris(6-isocyanatohexyl)-biuret.

In certain embodiments, the amount of ethylenically unsaturated isocyanate employed is only stoichiometrically sufficient to react a portion of the active hydrogen groups on the acrylic polymer. For example, in certain embodiments, 1 to 20 percent, such as 1 to 10 percent, of the active hydrogen groups on the acrylic polymer are reacted with the ethylenically unsaturated isocyanate and converted to a moiety that contains a urethane linkage and ethylenic unsaturation.

As previously indicated, in certain embodiments, the active hydrogen containing cationic acrylic polymers comprising pendant and/or terminal ethylenic unsaturation that are employed in certain embodiments of the present invention are prepared by reacting at least a portion of the epoxide groups on the previously described acrylic polymer comprising active hydrogen groups and epoxide groups with a compound comprising a primary or secondary amine.

Compounds comprising a primary or secondary amine suitable for use in the present invention include, for example, methylamine, diethanolamine, ammonia, diisopropanolamine, N-methyl ethanolamine, diethylenetriamine, dipropylenetriamine, bis-2-ethylhexylamine, bishexamethylenetriamine, the diketimine of diethylenetriamine, the diketimine of dipropylenetriamine, the diketimine of bishexamethylenetriamine and mixtures thereof.

In certain embodiments, the amount of the compound comprising a primary or secondary amine is stoichiometrically sufficient to react with at least 90 percent, such as at least 98 percent, of the epoxide groups on the acrylic polymer comprising active hydrogen groups and epoxide groups.

In certain embodiments, the amine functionality provides the acrylic polymer with cationic ionizable groups that can be ionized for solubilizing the polymer in water. As a result, in certain embodiments, the active hydrogen containing cationic acrylic polymer comprising pendant and/or terminal ethylenic unsaturation present in certain embodiments of the aqueous dispersions of the present invention is water-dispersible. As used herein, the term "water-dispersible" means that a material may be dispersed in water without the aid or use of a surfactant. As used herein, the term "ionizable" means a group capable of becoming ionic, i.e., capable of dissociating into ions or becoming electrically charged. For example, an amine may be neutralized with acid to form an ammonium salt group.

In certain embodiments, as indicated, the foregoing acrylic polymer is rendered water-dispersible by at least partial neutralization of the amino groups with an acid. Suitable acids include organic and inorganic acids such as formic acid, acetic acid, lactic acid, phosphoric acid, dimethylolpropionic acid and sulfamic acid. Mixtures of acids can be used. In certain embodiments, the cationic acrylic polymer contains 0.01 to 3, such as 0.1 to 1, milliequivalents of cationic salt groups per gram of polymer solids. In certain embodiments, the amine groups are neutralized with an acid such that the neutralization ranges from about 0.6 to about 1.1, such as 0.4 to 0.9 or, in some cases, 0.8 to 1.0, of the total theoretical neutralization equivalent.

In certain embodiments, the cationic acrylic polymer comprising pendant and/or terminal ethylenically unsaturation has a weight average molecular weight of less than 150,000 grams per mole, such as from 10,000 to 100,000 grams per mole, or, in some cases, from 40,000 to 80,000 grams per mole. The molecular weight of the foregoing cationic acrylic polymer and other polymeric materials used in the practice of the invention is determined by gel permeation chromatography using a polystyrene standard.

As previously indicated, in certain embodiments of the aqueous dispersions of the present invention, a cationic acrylic polymer is present that comprises the reaction product of (i) a water-dispersible polymerizable dispersant comprising a cationic acrylic polymer comprising pendant and/or terminal ethylenic unsaturation, such as that previously described, and (ii) an ethylenically unsaturated monomer. Suitable ethylenically unsaturated monomers include any of the polymerizable ethylenically, unsaturated monomers, including vinyl monomers known in the art. Non-limiting examples of useful ethylenically unsaturated carboxylic acid functional group-containing monomers include (meth) acrylic acid, beta-carboxyethyl acrylate, acryloxypropionic acid, crotonic acid, fumaric acid, monoalkyl esters of fumaric acid, maleic acid, monoalkyl esters of maleic acid, itaconic acid, monoalkyl esters of itaconic acid and mixtures thereof. As used herein, "(meth)acrylic" is intended to include both acrylic and methacrylic.

Non-limiting examples of other useful ethylenically unsaturated monomers free of carboxylic acid functional groups include alkyl esters of (meth)acrylic acids, for example, ethyl (meth)acrylate, methyl(meth)acrylate, butyl(meth)acrylate, 2-ethylhexyl(meth)acrylate, 2-hydroxyethyl(meth)acrylate, hydroxypropyl(meth)acrylate, hydroxy butyl(meth)acrylate, isobornyl(meth)acrylate, lauryl(meth)acrylate, and ethylene glycol di(meth)acrylate; vinyl aromatics such as styrene and vinyl toluene; (meth)acrylamides such as N-butoxymethyl acrylamide; acrylonitriles; dialkyl esters of maleic and fumaric acids; vinyl and vinylidene halides; vinyl acetate; vinyl ethers; allyl ethers; allyl alcohols; derivatives thereof and mixtures thereof.

The ethylenically unsaturated monomers also can include ethylenically unsaturated, beta-hydroxy ester functional monomers, such as those derived from the reaction of an ethylenically unsaturated acid functional monomer, such as a monocarboxylic acid, for example, acrylic acid, and an epoxy compound which does not participate in the free radical initiated polymerization with the unsaturated acid monomer. Examples of such epoxy compounds are glycidyl ethers and esters. Suitable glycidyl ethers include glycidyl ethers of alcohols and phenols such as butyl glycidyl ether, octyl glycidyl ether, phenyl glycidyl ether and the like.

In certain embodiments, the cationic acrylic polymer comprising pendant and/or terminal ethylenic unsaturation and the ethylenically unsaturated monomer are present in the aqueous dispersions of the present invention in a weight ratio of 95:5 to 30:70, such as 90:10 to 40:60, or, in some cases, from 80:20 to 60:40.

The aqueous dispersions comprising polymer-enclosed particles of the present invention can be prepared by any of a variety of methods. In certain embodiments, however, the aqueous dispersions of the present invention are made by a method comprising (1) providing a mixture, in an aqueous medium, of (i) particles, (ii) a polymerizable ethylenically unsaturated monomer, and (iii) a water-dispersible polymerizable dispersant comprising a cationic acrylic polymer comprising pendant and/or terminal ethylenic unsaturation, and (2) polymerizing the ethylenically unsaturated monomer and polymerizable dispersant to form an aqueous dispersion of polymer-enclosed particles comprising a cationic acrylic polymer.

In these embodiments, the water-dispersible polymerizable dispersant is capable is dispersing itself and other materials, including the ethylenically unsaturated monomers, in the aqueous medium without the need for surfactants and/or high shear conditions. As a result, the foregoing method for making an aqueous dispersion of polymer-enclosed particles is particularly suitable in situations where use of the high stress shear conditions described in, for example, U.S. patent application Ser. No. 10/876,031 at [0081] to [0084] and United States Published Patent Application No. 2005/0287348 at [0046], is not desired or feasible. Therefore, in certain embodiments, the aqueous dispersions of the present invention are prepared by a method that does not include the step of subjecting the mixture of particles, polymerizable ethylenically unsaturated monomer, and water-dispersible polymerizable dispersant to high stress shear conditions.

In addition, the foregoing method of the present invention enables the formation of nanoparticles in situ, rather than requiring the formation of nanoparticles prior preparation of the aqueous dispersion. In these methods, particles having an average particle size of greater than 300 nanometers, in some cases, 1 micron or more, after being mixed with the ethylenically unsaturated monomer and the water-dispersible polymerizable dispersant in the aqueous medium, may be formed into nanoparticles (i.e., the nanoparticles are formed in situ). In certain embodiments, the nanoparticles are formed by subjecting the aqueous medium to pulverizing conditions. For example, the particles can be milled with milling media having a particle size of less than 0.5 millimeters, or less than 0.3 millimeters, or, in some cases, less than 0.1 millimeters. In these embodiments, the particles can be milled to nanoparticle size in a high energy mill in the presence of the aqueous medium, the polymerizable ethylenically unsaturated monomer, and the water-dispersible polymerizable dispersant. If desired, another dispersant can be used, such as SOLSPERSE 27000, available from Avecia, Inc.

As indicated, the foregoing methods for making aqueous dispersions of the present invention include the step of free-radically polymerizing the ethylenically unsaturated monomer and polymerizable dispersant to form polymer-enclosed particles comprising a water-dispersible polymer. In certain embodiments, at least a portion of the polymerization occurs during formation of nanoparticles, if applicable. Also, a free radical initiator may be used. Both water and oil soluble initiators can be used.

Non-limiting examples suitable water-soluble initiators include ammonium peroxydisulfate, potassium peroxydisulfate and hydrogen peroxide. Non-limiting examples of oil soluble initiators include t-butyl hydroperoxide, dilauryl peroxide and 2,2'-azobis(isobutyronitrile). In many cases, the reaction is carried out at a temperature ranging from 20° to 80° C. The polymerization can be carried out in either a batch or a continuous process. The length of time necessary to carry out the polymerization can range from, for example, 10 minutes to 6 hours, provided that the time is sufficient to form a polymer in situ from the one or more ethylenically unsaturated monomers.

Once the polymerization process is complete, the resultant product is a stable dispersion of polymer-enclosed particles in an aqueous medium that can contain some organic solvent. Some or all of the organic solvent can be removed via reduced pressure distillation at a temperature, for example, of less than 40° C. As used herein, the term "stable dispersion" or "stably dispersed" means that the polymer-enclosed particles neither settle nor coagulate nor flocculate from the aqueous medium upon standing.

In certain embodiments, the polymer-enclosed particles are present in the aqueous dispersions of the present invention in an amount of at least 10 weight percent, or in an amount of 10 to 80 weight percent, or in an amount of 25 to 50 weight percent, or in an amount of 25 to 40 weight percent, with weight percents being based on weight of total solids present in the dispersion.

In certain embodiments, the dispersed polymer-enclosed particles have a maximum haze of 10%, or, in some cases, a maximum haze of 5%, or, in yet other cases, a maximum haze of 1%, or, in other embodiments, a maximum haze of 0.5%. As used herein, "haze" is determined by ASTM D1003.

The haze values for the polymer-enclosed particles described herein are determined by first having the particles, such as nanoparticles, dispersed in a liquid (such as water, organic solvent, and/or a dispersant, as described herein) and then measuring these dispersions diluted in a solvent, for example, butyl acetate, using a Byk-Gardner TCS (The Color Sphere) instrument having a 500 micron cell path length. Because the % haze of a liquid sample is concentration dependent, the % haze as used herein is reported at a transmittance of about 15% to about 20% at the wavelength of maximum absorbance. An acceptable haze may be achieved for relatively large particles when the difference in refractive index between the particles and the surrounding medium is low. Conversely, for smaller particles, greater refractive index differences between the particle and the surrounding medium may provide an acceptable haze.

In the foregoing methods of the present invention, upon reaction of the ethylenically unsaturated monomer with the polymerizable dispersant, polymer-enclosed particles are formed, which, as previously indicated, the inventors believe results in a phase barrier that physically prevents the particles, particularly nanoparticles, from re-agglomerating within the aqueous dispersion. As a result, the foregoing methods of the present invention result in an aqueous dispersion of particles, such as nanoparticles, wherein reagglomeration of the nanoparticles is minimized or avoided altogether.

The present invention is also directed to curable, electrodepositable coating compositions comprising a resinous phase dispersed in an aqueous medium, wherein the resinous phase comprises the previously described polymer-enclosed particles and (2) a curing agent comprising reactive groups reactive with active-hydrogen groups. As used herein, the term "electrodepositable coating composition" refers to a composition that is capable of being deposited onto a conductive substrate under the influence of an applied electrical potential.

In certain embodiments, the electrodepositable coating compositions of the present invention comprise an active hydrogen group-containing ionic electrodepositable resin that is different from the reaction product of (i) a polymerizable ethylenically unsaturated monomer, and (ii) a water-dispersible polymerizable dispersant comprising a cationic acrylic polymer comprising pendant and/or terminal ethylenic unsaturation described above that produces the foregoing polymer-enclosed particles.

In certain embodiments, the electrodepositable compositions utilized in certain embodiments of the present invention contain, as a main film-forming polymer, an active hydrogen-containing cationic electrodepositable resin. Examples of such cationic film-forming resins include amine salt group-containing resins, such as the acid-solubilized reaction products of polyepoxides and primary or secondary amines, such as those described in U.S. Pat. Nos. 3,663,389; 3,984,299; 3,947,338; and 3,947,339. Besides the epoxy-amine reaction products, film-forming resins can also be selected from cationic acrylic resins, such as those described in U.S. Pat. Nos. 3,455,806 and 3,928,157.

Besides amine salt group-containing resins, quaternary ammonium salt group-containing resins can also be employed, such as those formed from reacting an organic polyepoxide with a tertiary amine salt as described in U.S. Pat. Nos. 3,962,165; 3,975,346; and 4,001,101. Examples of other cationic resins are ternary sulfonium salt group-containing resins and quaternary phosphonium salt-group containing resins, such as those described in U.S. Pat. Nos. 3,793,278 and 3,984,922, respectively. Also, film-forming resins which cure via transesterification, such as described in European Application No. 12463 can be used. Further, cationic compositions prepared from Mannich bases, such as described in U.S. Pat. No. 4,134,932, can be used.

In certain embodiments, the resins present in the electrodepositable composition are positively charged resins which contain primary and/or secondary amine groups, such as described in U.S. Pat. Nos. 3,663,389; 3,947,339; and 4,116,900. In U.S. Pat. No. 3,947,339, a polyketimine derivative of a polyamine, such as diethylenetriamine or triethylenetetraamine, is reacted with a polyepoxide. When the reaction product is neutralized with acid and dispersed in water, free primary amine groups are generated. Also, equivalent products are formed when polyepoxide is reacted with excess polyamines, such as diethylenetriamine and triethylenetetraamine, and the excess polyamine vacuum stripped from the reaction mixture, as described in U.S. Pat. Nos. 3,663,389 and 4,116,900.

In certain embodiments, the foregoing active hydrogen-containing ionic electrodepositable resin is present in the electrodepositable composition in an amount of 1 to 60 percent by weight, such as 5 to 25 percent by weight, based on total weight of the electrodeposition bath.

As indicated, the resinous phase of the electrodepositable composition often further comprises a curing agent adapted to react with active hydrogen groups. For example, both blocked organic polyisocyanate and aminoplast curing agents are suitable for use in the present invention, although blocked isocyanates are often preferred for cathodic electrodeposition. The polyisocyanates can be fully blocked as described in U.S. Pat. No. 3,984,299 at col. 1, lines 1 to 68, col. 2, and col. 3, lines 1 to 15, or partially blocked and reacted with the polymer backbone as described in U.S. Pat. No. 3,947,338 at col. 2, lines 65 to 68, col. 3, and col. 4 lines 1 to 30, the cited portions of which being incorporated herein by reference. By "blocked" is meant that the isocyanate groups have been reacted with a compound so that the resultant blocked isocyanate group is stable to active hydrogens at ambient temperature but reactive with active hydrogens in the film forming polymer at elevated temperatures usually between 90° C. and 200° C.

Suitable polyisocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates, such as triisocyanates can be used. An example would include triphenylmethane-4,4',4"-triisocyanate. Isocyanate prepolymers with polyols such as neopentyl glycol and trimethylolpropane and with polymeric polyols such as polycaprolactone diols and triols (NCO/OH equivalent ratio greater than 1) can also be used.

The polyisocyanate curing agents are typically utilized in amounts ranging from 5 percent to 60 percent by weight, such as from 20 percent to 50 percent by weight, the percentages based on the total weight of the resin solids of the electrodepositable composition.

In certain embodiments, the electrodepositable coating composition comprising a film-forming resin also comprises yttrium. In certain embodiments, yttrium is present in such compositions in an amount from 10 to 10,000 ppm, such as not more than 5,000 ppm, and, in some cases, not more than 1,000 ppm, of total yttrium (measured as elemental yttrium).

Both soluble and insoluble yttrium compounds may serve as the source of yttrium. Examples of yttrium sources suitable for use in lead-free electrodepositable coating compositions are soluble organic and inorganic yttrium salts such as yttrium acetate, yttrium chloride, yttrium formate, yttrium carbonate, yttrium sulfamate, yttrium lactate and yttrium nitrate. When the yttrium is to be added to an electrocoat bath as an aqueous solution, yttrium nitrate, a readily available yttrium compound, is a preferred yttrium source. Other yttrium compounds suitable for use in electrodepositable compositions are organic and inorganic yttrium compounds such as yttrium oxide, yttrium bromide, yttrium hydroxide, yttrium molybdate, yttrium sulfate, yttrium silicate, and yttrium oxalate. Organoyttrium complexes and yttrium metal can also be used. When the yttrium is to be incorporated into an electrocoat bath as a component in the pigment paste, yttrium oxide is often the preferred source of yttrium.

The electrodepositable compositions described herein are in the form of an aqueous dispersion wherein the resin is in the dispersed phase and the water is in the continuous phase. The average particle size of the resinous phase is generally less than 1.0 and usually less than 0.5 microns, often less than 0.15 micron.

The concentration of the resinous phase in the aqueous medium is often at least 1 percent by weight, such as from 2 to 60 percent by weight, based on total weight of the aqueous dispersion. When such compositions are in the form of resin concentrates, they generally have a resin solids content of 20 to 60 percent by weight based on weight of the aqueous dispersion.

The electrodepositable compositions described herein are often supplied as two components: (1) a clear resin feed, which includes generally the active hydrogen-containing ionic electrodepositable resin, i.e., the main film-forming polymer, the curing agent, and any additional water-dispersible, non-pigmented components; and (2) a pigment paste, which generally includes one or more pigments, a water-dispersible grind resin which can be the same or different from the main-film forming polymer, and, optionally, additives such as wetting or dispersing aids. Electrodeposition bath components (1) and (2) may be dispersed in an aqueous medium which comprises water and, usually, coalescing solvents.

As aforementioned, besides water, the aqueous medium may contain a coalescing solvent. Useful coalescing solvents are often hydrocarbons, alcohols, esters, ethers and ketones. The preferred coalescing solvents are often alcohols, polyols and ketones. Specific coalescing solvents include isopropanol, butanol, 2-ethylhexanol, isophorone, 2-methoxypentanone, ethylene and propylene glycol and the monoethyl monobutyl and monohexyl ethers of ethylene glycol. The amount of coalescing solvent is generally between 0.01 and 25 percent, such as from 0.05 to 5 percent by weight based on total weight of the aqueous medium.

In certain embodiments, the electrodepositable compositions of the present invention further comprise a catalyst for the reaction of the main film-forming polymer and the curing agent. Suitable such catalyst include those described in United States Patent Application Publication No. 2006/0042949 at [0058], the cited portion of which being incorporated herein by reference, as well as the catalysts described and claimed in U.S. patent application Ser. No. 11/835,600, incorporated herein by reference in its entirety.

After deposition, the coating is often heated to cure the deposited composition. The heating or curing operation is often carried out at a temperature in the range of from 120 to 250° C., such as from 120 to 190° C. for a period of time ranging from 10 to 60 minutes. In certain embodiments, the thickness of the resultant film is from 10 to 50 microns.

As a result, the present invention is also directed to substrates, such as metal substrates, at least partially coated by a coating deposited from an electrodepositable coating composition of the present invention.

The electrodepositable coating compositions of the present invention may be used to form a single coating, for example, a monocoat, a clear top coating or a base coat in a two-layered system or both; or as one or more layers of a multi-layered system including a clear top coating composition, a colorant layer and/or a base coating composition, and/or a primer layer, including, for example, an electrodeposition primer and/or a primer-surfacer layer.

The present invention is also directed to substrates at least partially coated with a multi-layer composite coating wherein at least one coating layer is deposited from such a composition. In certain embodiments, for example, the electrodepositable coating composition of the present invention comprises the basecoat layer in a multi-layer composite coating comprising a basecoat and a topcoat. As a result, in these embodiments, after application and curing of the electrodepositable coating composition of the present invention, at least one topcoat layer can be applied to the basecoat layer. The topcoat can, for example, be deposited from a powder coating composition, an organic solvent-based coating composition or a water-based coating composition, as is well known in the art. The film-forming composition of the topcoat can be any of the compositions useful in coatings applications, including, for example, a film-forming composition that comprises a resinous binder selected from acrylic polymers, polyesters, including alkyds, and polyurethanes. The topcoat composition can be applied by any conventional coating technique such as brushing, spraying, dipping or flowing, but they are most often applied by spraying. The usual spray techniques and equipment for air spraying, airless spray and electrostatic spraying in either manual or automatic methods can be used.

In certain embodiments, the present invention is directed to reflective surfaces at least partially coated with a color-imparting non-hiding coating layer electrophoretically deposited from an electrodepositable coating composition of the present invention. In certain embodiments, a clearcoat layer may be deposited over at least a portion of the color-imparting non-hiding coating layer.

As used herein, the term "reflective surface" refers to a surface comprising a reflective material having a total reflectance of at least 30%, such as at least 40%. "Total reflectance" refers herein to the ratio of reflected light from an object relative to the incident light that impinges on the object in the visible spectrum integrating over all viewing angles. "Visible spectrum" refers herein to that portion of the electromagnetic spectrum between wavelengths 400 and 700 nanometers. "Viewing angle" refers herein to the angle between the viewing ray and a normal to the surface at the point of incidence. The reflectance values described herein may be determined, for example, by using a Minolta Spectrophotometer CM-3600d according to the manufacturer supplied instructions.

In certain embodiments, the reflective surface comprises a substrate material such as, for example, polished aluminum, cold roll steel, chrome-plated metal, or vacuum deposited metal on plastic, among others. In other embodiments, the reflective surface may comprise a previously coated surface which may, for example, comprise a reflective coating layer deposited from a coating composition, such as, for example, a silver metallic basecoat layer, a colored metallic basecoat layer, a mica containing basecoat layer, or a white basecoat layer, among others.

Such reflective coating layers may be deposited from a film-forming composition that may, for example, include any of the film-forming resins typically used in protective coating compositions. For example, the film-forming composition of the reflective coating may comprise a resinous binder and one or more pigments to act as the colorant. Useful resinous binders include, but are not limited to, acrylic polymers, polyesters, including alkyds and polyurethanes. The resinous binders for the reflective coating composition may, for example, be embodied in a powder coating composition, an organic solvent-based coating composition or a water-based coating composition.

As noted, the reflective coating composition can contain pigments as colorants. Suitable pigments for the reflective coating composition include, for example, metallic pigments, which include aluminum flake, copper or bronze flake and metal oxide coated mica; non-metallic color pigments, such as titanium dioxide, iron oxide, chromium oxide, lead chromate, and carbon black; as well as organic pigments, such as, for example, phthalocyanine blue and phthalocyanine green.

The reflective coating composition can be applied to a substrate by any conventional coating technique such as brushing, spraying, dipping or flowing, among others. The usual spray techniques and equipment for air spraying, airless spraying and electrostatic spraying in either manual or automatic methods can be used. During application of the basecoat to the substrate, the film thickness of the basecoat formed on the substrate often ranges from 0.1 to 5 mils (2.5 to 127 micrometers), or 0.1 to 2 mils (2.5 to 50.8 micrometers).

After forming a film of the reflective coating on the substrate, the reflective coating can be cured or alternatively given a drying step in which solvent is driven out of the basecoat film by heating or an air drying period before application of subsequent coating compositions. Suitable drying conditions will depend on the particular basecoat composition, and one the ambient humidity if the composition is water-borne, but often, a drying time of from 1 to 15 minutes at a temperature of 75° to 200° F. (21° to 93° C.) will be adequate.

The reflective surfaces of the present invention are at least partially coated with a color-imparting non-hiding coating layer deposited from an electrodepositable coating composition of the present invention. As used herein, the term "non-hiding coating layer" refers to a coating layer wherein, when deposited onto a surface, the surface beneath the coating layer is visible. In certain embodiments of the present invention, the surface beneath the non-hiding coating layer is visible when the non-hiding layer is applied at a dry film thickness of 0.5 to 5.0 mils (12.7 to 127 microns). One way to assess non-hiding is by measurement of opacity. As used herein, "opacity" refers to the degree to which a material obscures a substrate.

"Percent opacity" refers herein to the ratio of the reflectance of a dry coating film over a black substrate of 5% or less reflectance, to the reflectance of the same coating film, equivalently applied and dried, over a substrate of 85% reflectance. In certain embodiments of the present invention, the color-imparting non-hiding coating layer has a percent opacity of no more than 90 percent, such as no more than 50 percent, at a dry film thickness of one (1) mil (about 25 microns).

In certain embodiments of the reflective surfaces of the present invention, a clearcoat layer is deposited over at least a portion of the color-imparting non-hiding coating layer. The clearcoat layer may be deposited from a composition that comprises any typically film-forming resin and can be applied over the color-imparting non-hiding layer to impart additional depth and/or protective properties to the surface underneath. The resinous binders for the clearcoat can be embodied as a powder coating composition, an organic solvent-based coating composition, or a water-based coating composition, such as an electrodepositable composition. Optional ingredients suitable for inclusion in the clearcoat composition include those that are well known in the art of formulating surface coatings, such as those materials described earlier. The clearcoat composition can be applied to a substrate by any conventional coating technique such as brushing, spraying, dipping or flowing, among others.

Illustrating the invention are the following examples that are not to be considered as limiting the invention to their details. All parts and percentages in the examples, as well as throughout the specification, are by weight unless otherwise indicated.

EXAMPLES

Example 1

Cationically Stabilized Polyacrylic Dispersion

This example describes the preparation of a cationically stabilized polyacrylic dispersion that was subsequently used to the form the cationic encapsulating dispersions of Example 2. The polyacrylate dispersion was prepared from the following mixture of ingredients in the ratios indicated:

| Ingredients | Weight (grams) |
| --- | --- |
| Charge I | |
| Methyl ether propylene glycol acetate | 88 |
| Charge II | |
| N-Butyl acrylate | 208.0 |
| Hydroxypropyl methacrylate | 84.3 |
| Methyl methacrylate | 205.0 |
| Glycidyl methacrylate | 80.0 |
| Lupersol-555 | 30.3 |
| Methyl ether propylene glycol acetate | 30.0 |
| Charge III | |
| Methyl ether propylene glycol acetate | 10.0 |
| Hydroxyethylacrylate/IPDI reaction product | 12.3 |
| Dibutyl tin dilaurate | 0.4 |
| Charge IV | |
| N-Methylethanolamine | 38.2 |
| 2-bis ethylhexylamine | 3.2 |
| Charge V | |
| 50% Lactic acid | 56.4 |
| Charge VI | |
| Deionized water | 823.2 |

The acrylic dispersion was prepared in a four neck round bottom flask equipped with an electronic temperature probe, mechanical stirrer, condenser, and a heating mantle. Charge I was stirred under nitrogen for 5 minutes in the flask and heated to a temperature of 138° C. Charge II was mixed and added over the course of 2 hours via addition funnel, while under a nitrogen blanket. After the addition was complete the mixture was held at 138° C. for 30 minutes to ensure completion of the first stage of the reaction. The reaction solution was allowed to cool to 120° C. before the addition of Charge III. Once cooled, air was introduced to the flask followed by the addition of Charge III. The isocyanate reaction was completed within 90 minutes and was monitored by the disappearance of the NCO absorption in the infrared spectrum (2270 cm$^{-1}$). The reaction product was cooled to 115° C. and Charge IV was added. The epoxy/amine reaction exothermed slightly. The reaction product was held for 90 minutes at 115° C. Next, the reaction product was allowed to cool to 90° C. and Charge V was added. The contents were held for 20 minutes and then poured in a vessel containing Charge VI (50° C. deionized water). The mixture was stirred until dispersed.

The final product was a translucent emulsion with $M_n$=4437 g/mol, $M_w$=53.428 g/mol, Polydispersity index of 12.0 and a nonvolatile content of 39.7% as measured at 110° C. for one hour.

Example 2

Preparation of the Cationically Stabilized Encapsulating Resin

This example describes the preparation of a cationically stabilized dispersion capable of producing polyacrylate/nanopigment dispersions. The dispersion was prepared from the following mixture of ingredients in the ratios indicated:

| Ingredients | Weight (grams) |
| --- | --- |
| Polyacrylate dispersion of Example 1 | 1200.0 |
| Deionized water | 1000.0 |
| Styrene | 80.0 |
| Butyl Methacrylate | 80.0 |

The ingredients were mixed in a glass vessel with a steel stirrer driven by an air motor for 1 hour. The resulting dispersion had a non-volatile content of 19.4% as measured at 110° C. for one hour.

Example 3

Polyacrylate/Nanopigment Dispersion

This example describes the preparation of a nano-sized PB 15:3 phthalocyanine blue pigment dispersion. The dispersion was prepared from the following mixture of ingredients in the ratios indicated:

| Ingredients | Weight (grams) |
| --- | --- |
| Polyacrylate dispersion of Example 2 | 952.5 |
| PB 15:3 pigment[2] | 63.5 |

[2]Commercially available from BASF Corp.

The ingredients were mixed using a 4.5 inch Cowles blade attached to an air motor. The mixture was then pre-dispersed in a 250 ml Eiger mill containing 187.5 mL of 0.8-1.0 mm Zirconox YTZ® milling media for 30 minutes at 3000 rpm and then transferred to a modified 250 ml Eiger mill containing 187.5 mL of 0.3 mm Zirconox YTZ® grinding media. The mixture was milled at 3500 rpm for a total time of 6 hours. The final product was a cyan (Blue) liquid with a pH of 5.95, and a nonvolatile content of 24.9% as measured at 110° C. for one hour.

Example 4

Preparation of Tinted Electrodepositable Paint

This example describes the preparation of an electrocoat bath that can be used to produce coated metal parts. The following ingredients were mixed in the ratios as stated below;

| Ingredients | Weight (grams) |
| --- | --- |
| CR935-electrocoat resin[3] | 704.3 |
| Polyacrylate/Nanopigment dispersion of Example 3 | 58.7 |
| Deionized water | 1037.0 |

[3]Commercially available from PPG Industries, Inc.

The ingredients were mixed to provide a coating bath with a pigment to binder ratio of 0.02 with a nonvolatile content of 9.8% as measured at 110° C. for one hour.

Example 5

Preparation of Coated Objects

The following voltages were applied to aluminum objects submerged in a bath of prepared in Example 4 for a duration of 30 seconds to yield aluminum objects coated with a transparent color layer with the controlled film builds. The samples were baked at 325° F. for 20 minutes prior to measuring the film build.

| Voltage applied | Resultant film build (mils) |
| --- | --- |
| 50 | 0.5 |
| 75 | 0.7 |
| 100 | 0.8 |
| 125 | 0.8 |

It will be appreciated by those skilled in the art that changes could be made to the embodiments described above without departing from the broad inventive concept thereof. It is understood, therefore, that this invention is not limited to the particular embodiments disclosed, but it is intended to cover modifications that are within the spirit and scope of the invention, as defined by the appended claims.

I claim:

1. A method for making an aqueous dispersion of polymer-enclosed particles, comprising:
   (1) providing a mixture, in an aqueous medium, the mixture comprising:
      (a) particles,
      (b) a polymerizable ethylenically unsaturated monomer, and
      (c) a water-dispersible polymerizable dispersant comprising a cationic acrylic polymer comprising active hydrogen groups, wherein 1 to 20 percent of the active hydrogen groups are reacted with an ethylenically unsaturated isocyanate to form urethane and/or urea linkages and provide pendant and/or terminal ethylenic unsaturation, and
   (2) polymerizing the ethylenically unsaturated monomer and polymerizable dispersant to form an aqueous dispersion of polymer-enclosed particles comprising a cationic acrylic polymer.

2. The method of claim 1, wherein the particles have an average particle size greater than 300 nanometers.

3. The method of claim 2, further comprising subjecting the mixture to conditions whereby the particles are formed into nanoparticles having an average particle size less than 300 nanometers.

4. The method of claim 3, whereby the particles are formed into nanoparticles having an average particle size of no more than 100 nanometers.

5. The method of claim 3, wherein at least a portion of the ethylenically unsaturated monomer and polymerizable dispersant are polymerized during the formation of the nanoparticles.

6. The method of claim 1, wherein the particles comprise color-imparting particles.

7. The method of claim 6, wherein the color-imparting particles comprise an organic pigment.

8. The method of claim 1, wherein the cationic acrylic polymer comprises amino groups.

9. The method of claim 1, wherein the active hydrogen containing cationic acrylic polymer comprising pendant and/or terminal ethylenic unsaturation comprises the reaction product of:
  (a) an acrylic polymer comprising active hydrogen groups and epoxy groups;
  (b) an ethylenically unsaturated isocyanate; and
  (c) a primary or secondary amine.

10. The method of claim 9, wherein the acrylic polymer comprising active hydrogen groups and epoxide groups is the reaction product of reactants comprising:
  (a) 1 to 20 percent by weight, based on the total weight of the reactants, of active hydrogen containing ethylenically unsaturated compounds;
  (b) 1 to 20 percent by weight, based on the total weight of the reactants, of epoxide group containing ethylenically unsaturated compounds; and
  (c) 60 to 98 percent by weight, based on the total weight of the reactants, of ethylenically unsaturated compounds that do not include active hydrogen groups and epoxide groups.

11. The method of claim 9, wherein the primary or secondary amine is employed in an amount stoichiometrically sufficient to react with at least 90 percent of the epoxide groups on the acrylic polymer comprising active hydrogen groups and epoxide groups.

12. The method of claim 8, wherein the cationic acrylic polymer is rendered water dispersible by at least partially neutralizing the amino groups with an acid.

13. A method for making an aqueous dispersion of polymer-enclosed nanoparticles, comprising:
  (1) providing a mixture, in an aqueous medium, of:
    (a) particles having an average particle size greater than 300 nanometers,
    (b) a polymerizable ethylenically unsaturated monomer, and
    (c) a water-dispersible polymerizable dispersant comprising a cationic acrylic polymer comprising active hydrogen groups, wherein 1 to 20 percent of the active hydrogen groups are reacted with an ethylenically unsaturated isocyanate to form urethane and/or urea linkages and provide pendant and/or terminal ethylenic unsaturation, and
  (2) subjecting the mixture to conditions whereby:
    (a) the particles are formed into nanoparticles having an average particle size less than 300 nanometers, and
    (b) at least a portion of the ethylenically unsaturated monomer and polymerizable dispersant are polymerized during the formation of the nanoparticles to form an aqueous dispersion of polymer-enclosed nanoparticles comprising a cationic acrylic polymer.

14. A curable, electrodepositable coating composition comprising a resinous phase dispersed in an aqueous medium, wherein the resinous phase comprises:
  (a) a curing agent comprising reactive groups reactive with active-hydrogen groups, and
  (b) polymer-enclosed particles comprising a cationic acrylic polymer comprising the reaction product of:
    (i) a polymerizable ethylenically unsaturated monomer, and
    (ii) a water-dispersible polymerizable dispersant comprising a cationic acrylic polymer comprising active hydrogen groups, wherein 1 to 20 percent of the active hydrogen groups are reacted with an ethylenically unsaturated isocyanate to form urethane and/or urea linkages and provide pendant and/or terminal ethylenic unsaturation.

15. The curable, electrodepositable coating composition of claim 14, further comprising:
  (c) an active hydrogen group-containing ionic electrodepositable resin that is different from the reaction product of (b).

16. The curable, electrodepositable coating composition of claim 14, wherein the curing agent comprises a blocked organic polyisocyanate.

17. The curable, electrodepositable coating composition of claim 14, wherein the particles comprise nanoparticles having an average particle size of no more than 100 nanometers.

18. The curable, electrodepositable coating composition of claim 17, wherein the nanoparticles comprise color-imparting particles.

19. The curable, electrodepositable coating composition of claim 18, wherein the color-imparting particles comprise an organic pigment.

20. The curable, electrodepositable coating composition of claim 14, wherein the cationic acrylic polymer comprises amino groups at least partially neutralized with an acid.

21. A reflective surface at least partially coated with a color-imparting non-hiding coating layer electrophoretically deposited from the curable, electrodepositable coating composition of claim 14.

22. The method of claim 1, wherein the cationic acrylic polymer comprises pendant and/or terminal groups attached to the cationic acrylic polymer through urethane linkages, the pendant and/or terminal groups comprising ethylenic unsaturation.

23. The method of claim 1, wherein the cationic acrylic polymer comprises pendant and/or terminal (meth)acrylate functional groups attached to the cationic acrylic polymer through urethane linkages.

24. The curable, electrodepositable coating composition of claim 14, wherein the cationic acrylic polymer comprises pendant and/or terminal groups attached to the cationic acrylic polymer through urethane linkages, the pendant and/or terminal groups comprising ethylenic unsaturation.

25. The curable, electrodepositable coating composition of claim 14, wherein the cationic acrylic polymer comprises pendant and/or terminal (meth)acrylate functional groups attached to the cationic acrylic polymer through urethane linkages.

26. The method of claim 1, wherein the water-dispersible polymerizable dispersant comprises a water-dispersible, acid neutralized, polymerizable dispersant comprising a cationic acrylic polymer comprising pendant and/or terminal (meth)acrylate functional groups.

27. The method of claim 13, wherein the water-dispersible polymerizable dispersant comprises a water-dispersible, acid neutralized, polymerizable dispersant comprising a cationic acrylic polymer comprising pendant and/or terminal (meth)acrylate functional groups.

28. The curable, electrodepositable coating composition of claim 14, wherein the water-dispersible polymerizable dispersant comprises a water-dispersible, acid neutralized, polymerizable dispersant comprising a cationic acrylic polymer comprising pendant and/or terminal (meth)acrylate functional groups.

29. The method of claim 13, wherein the cationic acrylic polymer comprises pendant and/or terminal groups attached to the cationic acrylic polymer through urethane linkages, the pendant and/or terminal groups comprising ethylenic unsaturation.

30. The method of claim 13, wherein the cationic acrylic polymer comprises pendant and/or terminal (meth)acrylate functional groups attached to the cationic acrylic polymer through urethane linkages.

31. The method of claim 1, wherein the cationic acrylic polymer comprises pendant and/or terminal (meth)acrylate functional groups attached to the cationic acrylic polymer through urethane and/or urea linkages.

32. The method of claim 13, wherein the cationic acrylic polymer comprises pendant and/or terminal (meth)acrylate functional groups attached to the cationic acrylic polymer through urethane and/or urea linkages.

33. The curable, electrodepositable coating composition of claim 14, wherein the cationic acrylic polymer comprises pendant and/or terminal (meth)acrylate functional groups attached to the cationic acrylic polymer through urethane and/or urea linkages.

34. A method of using the curable, electrodepositable coating composition of claim 14, the method comprising depositing the coating composition onto a conductive substrate under the influence of an applied electrical potential to form a color-imparting non-hiding coating on the substrate.

\* \* \* \* \*